F. P. JOHNESS.
METHOD OF MOLDING DOUBLE HEADED CHAPLETS AND OTHER ARTICLES.
APPLICATION FILED OCT. 31, 1908.

966,558.

Patented Aug. 9, 1910.

2 SHEETS—SHEET 1.

Frank Paul Johness,
Inventor.

Witnesses
A. A. Olson
W. C. Smith

By
Joshua R. H. Potts.
Attorney

F. P. JOHNESS.
METHOD OF MOLDING DOUBLE HEADED CHAPLETS AND OTHER ARTICLES.
APPLICATION FILED OCT. 31, 1908.
966,558.
Patented Aug. 9, 1910.
2 SHEETS—SHEET 2.
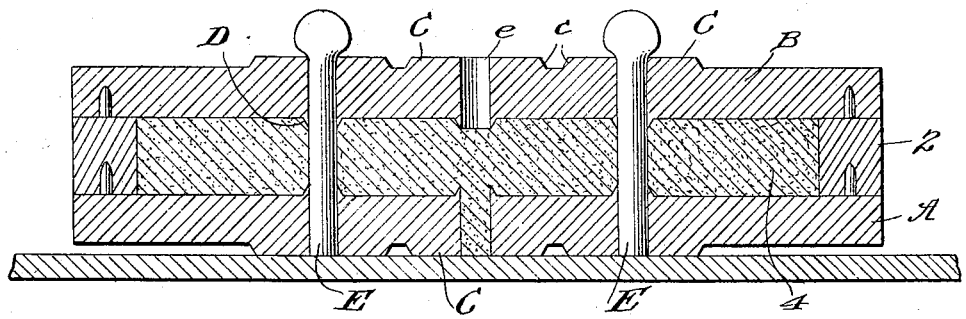
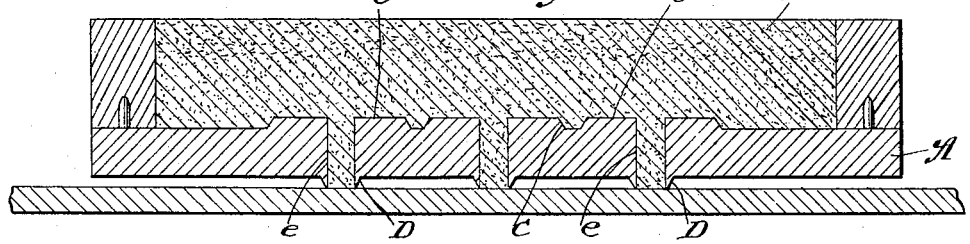
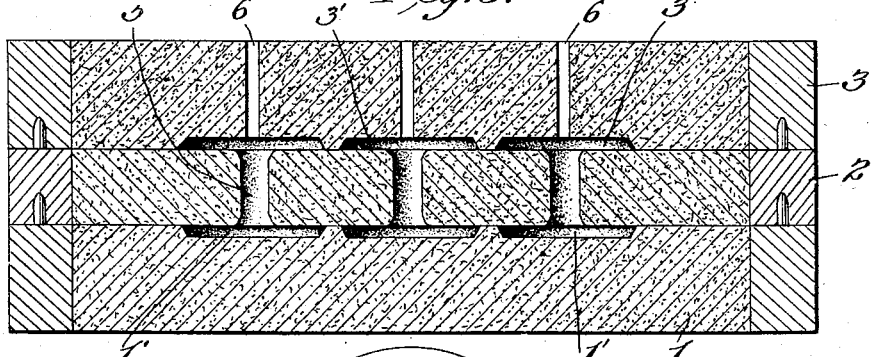
Frank Paul Johness,
Inventor.
Witnesses
By
Joshua R. H. Potts.
Attorney

UNITED STATES PATENT OFFICE.

FRANK PAUL JOHNESS, OF COLUMBUS, OHIO, ASSIGNOR OF ONE-FOURTH TO JOHN J. REES AND ONE-FOURTH TO THOMAS R. EVANS, OF COLUMBUS, OHIO.

METHOD OF MOLDING DOUBLE-HEADED CHAPLETS AND OTHER ARTICLES.

966,558. Specification of Letters Patent. Patented Aug. 9, 1910.

Application filed October 31, 1908. Serial No. 460,535.

*To all whom it may concern:*

Be it known that I, FRANK PAUL JOHNESS, a citizen of the United States, residing at Columbus, in the county of Franklin and State of Ohio, have invented certain new and useful Improvements in Methods of Molding Double-Headed Chaplets and other Articles, of which the following is a specification.

My invention relates to the operation of forming sand molds for casting, and particularly it relates to forming molds for chaplets or other double headed articles in which the heads are connected by a tie or bar.

I have shown in the accompanying drawings a series of views illustrating the various steps whereby a mold of this character is formed, and the means whereby my invention is accomplished.

Figure 1:
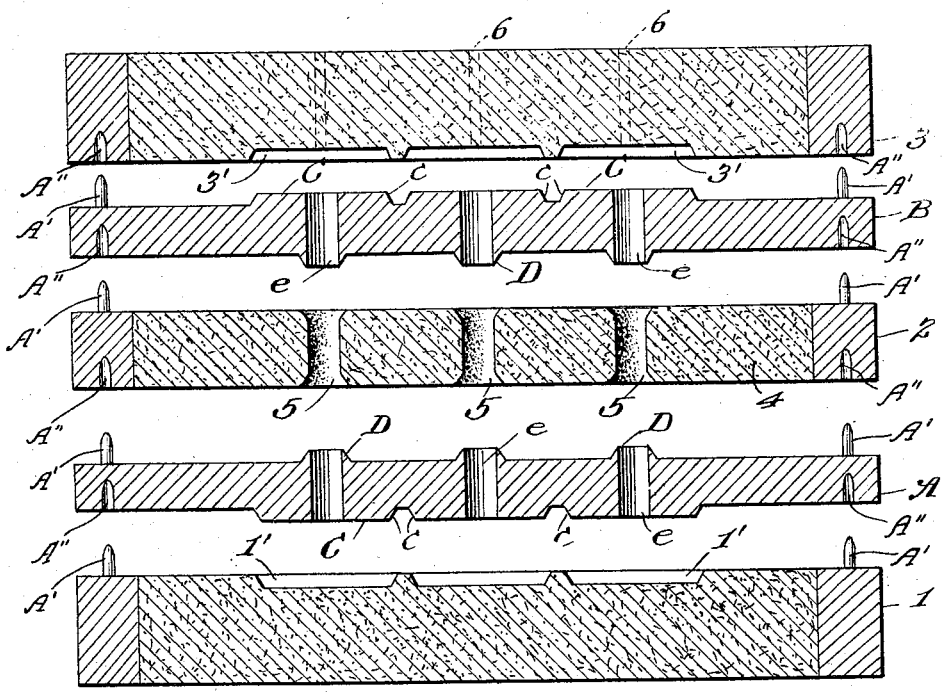
Figure 2:
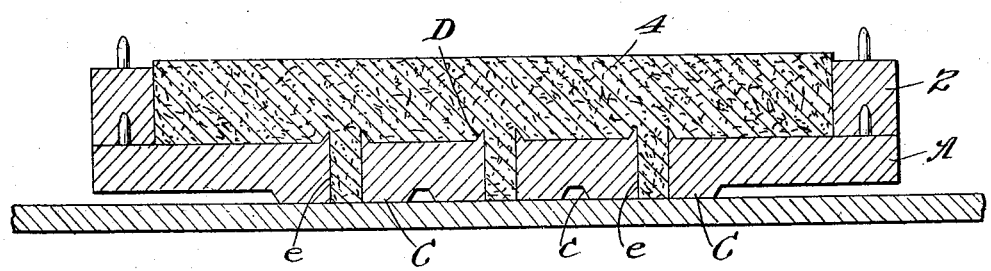

Figure 1 is a longitudinal section of the several sections of the flask and the pattern or match-board, detached from each other but consecutively arranged. Fig. 2 is a longitudinal section of one of the pattern forming boards and the first section of the flask. Fig. 3 is a like view showing both of the pattern forming boards and the cheek formed between. Fig. 4 is a like view showing the manner in which the drag or bottom of the mold is formed. Fig. 5 is a longitudinal section showing the complete mold after the pattern boards have been removed. Fig. 6 is a detail illustrating the form of the article which is to be molded by the pattern shown.

Like reference characters throughout the several views designate like parts.

In carrying out my invention I use three flask sections 1, 2, 3 of any ordinary construction, section 1 forming the drag or base of the mold, section 2 the cheeks and section 3 the cope. These flask walls may be of any desired shape. In connection with these three flask sections, I also use two "match-boards" or pattern boards A, B, for giving to the under surface of the cope, the upper and lower surface of the cheeks, and the upper surface of the drag such contour as will make a proper mold for the object desired.

In the example shown in the illustration, both match-boards A and B are formed on their outer faces with a series of circular elevations or bosses C projecting from the surface of the board and having inclined edges c. The inner faces of both boards are each provided with projecting hubs D which are axially central to the circular elevations or bosses C. Each of the boards is bored out for the passage of core pins as shown in Fig. 3, these bores e being located at the centers of the portions C and being but very slightly smaller in diameter than the diameter of the hubs D. While I have shown the parts C and D and pins E as circular, I do not of course limit myself to this form as they might be hexagonal, square or in any other desired shape.

In constructing the mold I first place the match-board A upon a molding bench with the hubs D upward. Upon this board is placed the flask section 2 which is adapted to form the cheeks of the mold. Molding sand 4 is now filled into the flask and thoroughly packed therein until it fills the flask and extends slightly above the upper edge of the same. This stage of the process is shown in Fig. 2. When the sand 4 is thoroughly packed in the flask section 2, the match-board B is placed upon it with the hubs D extending downward, and of course in exact alinement with hubs of the board A, the pins A' and sockets A'' in the edges of the flasks and match boards serving to properly position the parts. The board B is then forced downward against the cheek sand 4 until the pattern of the board has been duplicated on the upper surface of the cheek as shown in Fig. 4. The core pins E are then forced through the holes e in the top board B through the sand 4 and into the holes e in the board A. The core pins are then withdrawn from the flask leaving passages 5 in the sand 4.

The next step is to form the drag section of the mold. To that end the section 2 with the two boards on either side of it is inverted and the match-board A is removed, the bosses C being now uppermost. Upon this board the drag section is formed as shown in Fig. 4 by placing upon it the flask and filling said flask with sand. When the section 1 is removed from the board and overturned, it will have formed upon its upper face the reflex of the pattern on the under face of the board A, thus having circular depressions 1' on its upper surface, see Fig. 5.

The same operation is performed in order to make the cope. The flask 3 is placed on the upper face of the match-board B and suitable sprue cores 6 are placed within the flask in any desired manner, as indicated in dotted lines in Fig. 1, resting on the bosses C. Sand is then tamped into the flask 3 until it is filled, after which the sprue cores are removed, and the cope section is ready for use and is inverted on the cheek section, the under face of the cope having the depressions 3' formed therein.

The three sections having been made, they are placed together as in Fig. 5, forming a mold having a casting space within it of the character shown. My invention it will be seen is particularly applicable to casting articles having double heads or plates F, F' connected by a bar $F^2$. While this bar is shown as central to the plates F, F', and the plates as circular, the connecting bar might bear any desired relation to the heads or plates without in any way departing from the spirit of my invention.

My method is simple, eliminates to a large extent the necessity of skilled labor in forming molds of this character, economizes time, necessitates the use of but few parts, and is applicable to making a large variety of castings.

Having thus described my invention what I claim as new and desire to secure by Letters Patent is:

1. A molding apparatus for double headed articles comprising a cope flask, a cheek flask, and a drag flask, in combination with duplicate match or pattern boards having patterns projecting from one side of each of the boards and having core holes therethrough in alinement with said patterns, said boards being adapted to be placed on both sides of the cheek flask to mold the bottom and top surface of the sand in said cheek, the upper or pattern faces of said boards being adapted to be used to form patterns in the sand of the cope and drag sections of the mold, substantially as described.

2. For use with an apparatus for molding double headed articles, pattern or match-boards, one having the pattern of one head of the articles projecting from one side thereof, the other having the pattern for the other head of said article projecting from one side thereof, said boards each having passages formed therethrough leading from the upper face of said elevated pattern portions through the board to the other face thereof, the inner face of each of said boards being shaped to form a mold for the cheek, and the pattern faces of said boards being adapted to be used to form a reflex on the under and upper faces of a cope and drag respectively, substantially as described.

In testimony whereof I have signed my name to this specification in the presence of two subscribing witnesses.

FRANK PAUL JOHNESS.

Witnesses:
ALLEN STOCKSTILL,
FRED M. WILSON.